United States Patent [19]

Hawkes

[11] Patent Number: 4,538,120

[45] Date of Patent: Aug. 27, 1985

[54] CARRIER RECOVERY LOOP FOR RECEPTION OF QUADRAPHASE SHIFT KEYED SIGNALS

[75] Inventor: Thaddeus A. Hawkes, Haddonfield, N.J.

[73] Assignee: RCA Corporation, Princeton, N.J.

[21] Appl. No.: 562,525

[22] Filed: Dec. 19, 1983

[51] Int. Cl.³ .............................................. H03L 7/00
[52] U.S. Cl. ........................................ 331/12; 331/23; 331/25
[58] Field of Search ................... 331/10, 11, 12, 14, 331/17, 23, 25; 329/50, 122, 124, 125; 375/81, 82, 120

[56] References Cited

U.S. PATENT DOCUMENTS

| | | | |
|---|---|---|---|
| 4,027,265 | 5/1977 | Kabuyashi et al. | 329/122 |
| 4,054,838 | 10/1977 | Tretter | 375/120 |
| 4,491,805 | 1/1985 | Laures et al. | 331/23 X |

FOREIGN PATENT DOCUMENTS

| | | | |
|---|---|---|---|
| 2522519 | 9/1976 | Fed. Rep. of Germany | 329/50 |
| 127735 | 10/1980 | Japan | 331/11 |

*Primary Examiner*—Eugene R. LaRoche
*Assistant Examiner*—Robert J. Pascal

*Attorney, Agent, or Firm*—Joseph S. Tripoli; Robert L. Troike; William H. Meise

[57] ABSTRACT

A carrier recovery loop for a burst type QPSK system. A QPSK signal source of frequency $f_1$ has its output frequency doubled and then doubled again to produce a signal of $4f_1$ with the QPSK modulation thereby removed. Also provided are first and second phase locked loops comprising a common voltage controlled oscillator (VCO), and separate ones of first and second phase detectors, respectively, with each detector having a characteristic output which varies sinusoidally with linear variation of the phase difference of the two signals supplied thereto and with the negative-going crossover transitions of the characteristic output constituting unstable nulls. A third x2 frequency multiplier connects the output of the VCO to the first phase detector, and a fourth x2 frequency multiplier connects the output of the third x2 frequency multiplier to the second phase detector. The output signals of the phase detectors are compared to generate a control signal indicating when the output of the second phase detector is near an unstable null at which time a switch responds to the control signal to connect the output of the first phase detector to the input of the VCO.

7 Claims, 3 Drawing Figures

CARRIER RECOVERY LOOP FOR RECEPTION OF QUADRAPHASE SHIFT KEYED SIGNALS

BACKGROUND OF THE INVENTION

This invention relates generally to carrier signal recovery loops located at a receiver for the reception and demodulation of quadraphase shift keyed (QPSK) signals, and more particularly to such a carrier recovery loop for the demodulation of QPSK signals which are received intermittently in a burst mode. Such carrier recovery is one of several functions which together comprise the demodulation process by which signals received on a radio frequency carrier are detected and converted to baseband frequencies.

In some prior art methods of recovering the carrier at the receiver for demodulating a QPSK signal the frequency $f_c$ of the carrier signal $e_c$ of the QPSK signal is multiplied by four to remove the four phase modulation, leaving a line frequency sine wave component of $4f_c$. This sine wave signal is then employed as one input to the phase detector of a phase locked loop (PLL) circuit to become phase locked with the phase of a multiplied-by-four frequency ($4f_{vco}$) of a locally generated carrier signal $e_{vco}$ of a frequency $f_{vco}$ and generated in a voltage controlled oscillator (VCO).

The recovered carrier $e_{vco}$ of frequency $f_{vco}$ will then have one of four phase relationships, 0°, 90°, 180°, or 270° with the phase of the received carrier $e_c$ of frequency $f_c$. In a subsequent step in the demodulation process (not a part of the present invention) this phase ambiguity is resolved to obtain bit synchronization and detection.

In applications employing bursts of QPSK transmission, the received carrier will generally deviate from the phase locked condition between bursts so that when the next burst occurs the locally generated carrier signal is no longer phase locked with the carrier of the received signal and accordingly must be phase corrected before the demodulation of the next transmission burst can be accomplished.

When the system is operated in the burst mode of operation, it is assumed herein that each transmission burst will begin with a synchronizing preamble as is normally done in time division multiplex access (TDMA) transmissions. For the purpose of this invention it is further assumed that a portion of the burst preamble will consist of a sequence modulated by alternating symbol phases of zero and $\pi$ radians. Such a two valve sequence produces a line frequency component at $2f_c$ after frequency doubling (or $4f_c$ after frequency quadrupling) and permits the phase locked loop to initiate synchronization in the present invention.

As an example of the problem that can be encountered between transmission bursts assume that the phase of the VCO signal has wandered off the phase locked value by some phase between 0° and 360° of a cycle of the desired frequency $f_c$. As will become clearer later herein, the worst possible phase shifts that can occur between transmission bursts are even multiples of 45° of a cycle of $f_c$ which would establish a phase relation between the quadrupled (×4) frequency $4f_{vco}$ of the locally generated signal $e_{vco}$ and the quadrupled (×4) frequency $4f_c$ of the received carrier signal $e_c$ at phase angles of either 45°, 135°, 225° or 315°, relative to $f_c$. All of these phase relations represent an unstable null point at the output of the phase detector which compares the phases of the quadrupled frequencies $4f_c$ and $4f_{vco}$ of $e_c$ and $e_{vco}$. Thus, the phase of the quadrupled frequency $4f_{vco}$ of the local VCO signal $e_{vco}$ must be shifted by a full 180° of a cycle in order to become phase locked with the quadrupled frequency $4f_c$ of received signal $e_c$ at one of the four possible stable null points which occur at any one of the phase relations 0°, 90°, 180° or 270° between $e_{vco}$ and $e_c$.

The amount of time required for the quadrupled frequencies of $e_c$ and $e_{vco}$ to become phase locked at one of the above-mentioned four stable null points presents the specific problem which is met and solved by the present invention, particularly when the loop is initially near an unstable null. More specifically, it is a substantial reduction in the time required to acquire phase lock starting from the vicinity of one of the four unstable null points that the present invention achieves.

It should be specifically noted, as mentioned above, that the resolution of the ambiguity presented by the four stable null points, i.e., the selection of the proper one of the four stable null points, is not a part of the present invention. This problem is solved using such well-known techniques as differential coding of the transmitted data or the detection and correlation of coded words that are a part of the burst preamble mentioned above and which also serve to provide word synchronization.

The above-mentioned techniques are discussed in detail in the following three publications, all of which are incorporated in full herein by reference.

1. "Digital Communications—Satellite/Earth Station Engineering", pp 306–7, 385–6, Prentice-Hall 1983.
2. "Preamble Requirements for Burst-Type QPSK Satellite Communications under Low Es/No Conditions", by S. A. Rhodes, Proceedings of 1977 National Telecommunications Conference, pp 05:3-1 to 05:3-7.
3. "Phase-Ambiguity Resolution in a Four-Phase PSK Communication System", by E. R. Cacciamani and C. J. Wolejsza Jr., IEEE Trans. on Comm. Technology, Vol. COM-19, No. 6, Dec. 1971, pp 1200–1210.

After correction of the output of the local VCO to the proper one of the four possible stable null points of the ×4 frequencies, the output $e_{vco}$ of the local VCO is compared with $e_c$ for the demodulation function.

An unstable null point derives its label of instability from the fact that any change in the phase difference between the two signals being phase compared will produce a change in voltage at the output of the phase detector of a polarity which will increase such change in phase difference between the two signals, thereby increasing the phase difference until the phases of the two signals coincide, i.e., until a stable null point is reached, as at 0°. At a stable null point, any change in phase between the two signals from the stable null point will result in an output voltage from the phase detector which will cause the phase of the output of the VCO to change in a direction as to close the phase difference between the two signals, i.e., to return to the stable null.

SUMMARY OF THE INVENTION

In one form of the invention there is provided a QPSK signal source of frequency $f_1$, first and second ×2 frequency multipliers to produce a signal of $4f_1$ with the QPSK modulation thereby removed. Also provided are first and second phase locked loops comprising a common voltage controlled oscillator (VCO), and separate ones of first and second phase detectors, respectively, with each detector having a characteristic output which varies substantially sinusoidally with linear variation of the phase difference of the two signals supplied thereto and with the negative-going cross-over transitions of the characteristic output being an unstable null, a third x2 frequency multiplier connecting the VCO output to the first phase detector, and a fourth x2 frequency multiplier connecting the output of the third x2 frequency multiplier to the second phase detector. A comparator compares the output signals of the phase detectors to generate a control signal indicating when the output of the second phase detector is near an unstable null at which time a switch responds to the control signal to connect the output of the first phase detector to the input of the VCO.

DETAILED DESCRIPTION OF THE INVENTION

Figure 1:
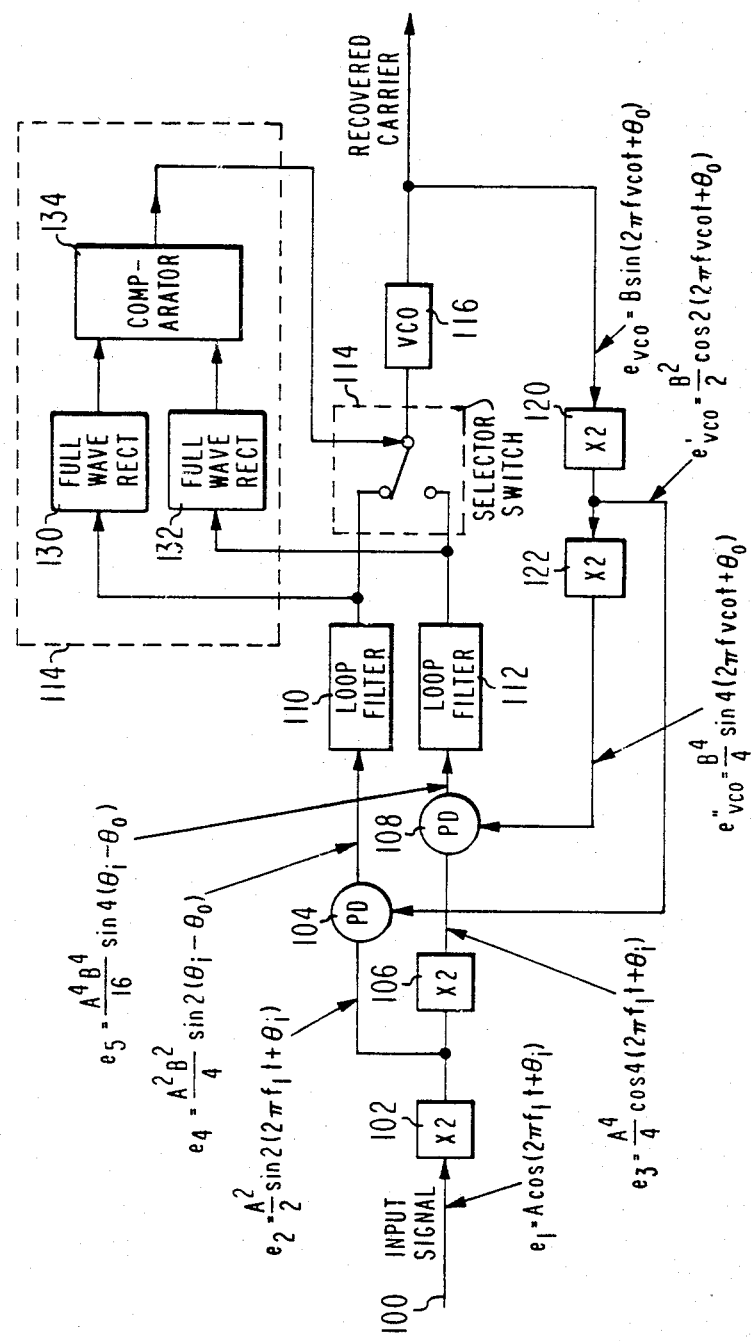
FIG. 1 is a combination block and logic diagram of one embodiment of the invention.

Referring now to FIG. 1, the received signal $e_1$, defined below in Expression 1, is supplied to the multiply-by-two (x2) frequency multiplier 102 to produce the signal $e_2$ defined below in Expression 2 which, in turn, is supplied to a second x2 frequency multiplier 106 and to a phase detector 104. The output $e_3$ of the x2 multiplier 106 is defined in Expression 3 and is supplied to a second phase detector 108.

$$e_1 = A \cos(2\pi f_1 t + \theta_i) \qquad \text{(Exp. 1)}$$

$$e_2 = \frac{A^2}{2} \sin 2(2\pi f_1 t + \theta_i) \qquad \text{(Exp. 2)}$$

$$e_3 = \frac{A^4}{4} \cos 4(2\pi f_1 t + \theta_i) \qquad \text{(Exp. 3)}$$

It can be seen that the X2 input signal $e_2$ of Expression 2 is supplied to the input of phase detector 104 and the X4 input signal $e_3$ of Expression 3 is supplied to the input of phase detector 108. The multiplication by 4 of input signal $e_1$ removes all of the quadra-phase modulation thereon so that the signal supplied to phase detector 108 no longer contains any of the phase modulation of the received signal $e_1$ and is, in fact, a sinusoidal line component of $4f_1$.

The ouput $e_{vco}$ (shown in Expression 4 below) of VCO 116 is also multiplied by two in the X2 frequency multiplier 120 to produce an output signal $e'_{vco}$ (shown in Expression 5 below) whose output, in turn, is supplied to the second input of phase detector 104 and also to the input of the second X2 frequency multiplier 122. The output $e''_{vco}$ of the second X2 multiplier 122, which is a X4 multiplication of the frequency $f_{vco}$ of the output of VCO 116, and shown in Expression 6 below, is supplied to a second input of phase detector 108.

$$e_{vco} = B \sin(2\pi f_{vco} t + \theta_o) \qquad \text{(Exp. 4)}$$

$$e'_{vco} = \frac{B^2}{2} \cos 2(2\pi f_{vco} t + \theta_o) \qquad \text{(Exp. 5)}$$

-continued $$e''_{vco} = \frac{B^4}{4} \sin 4(2\pi f_{vco} t + \theta_o) \qquad \text{(Exp. 6)}$$

Thus, phase detector 104 receives a X2 frequency input signal ($e_2$) derived from $e_1$ and a X2 frequency input signal $e'_{vco}$ derived from VCO 116 and phase detector 108 receives a X4 frequency input signal $e_3$ derived from $e_1$ and the X4 frequency input signal $e''_{vco}$ derived from $e_{vco}$.

Figure 2:
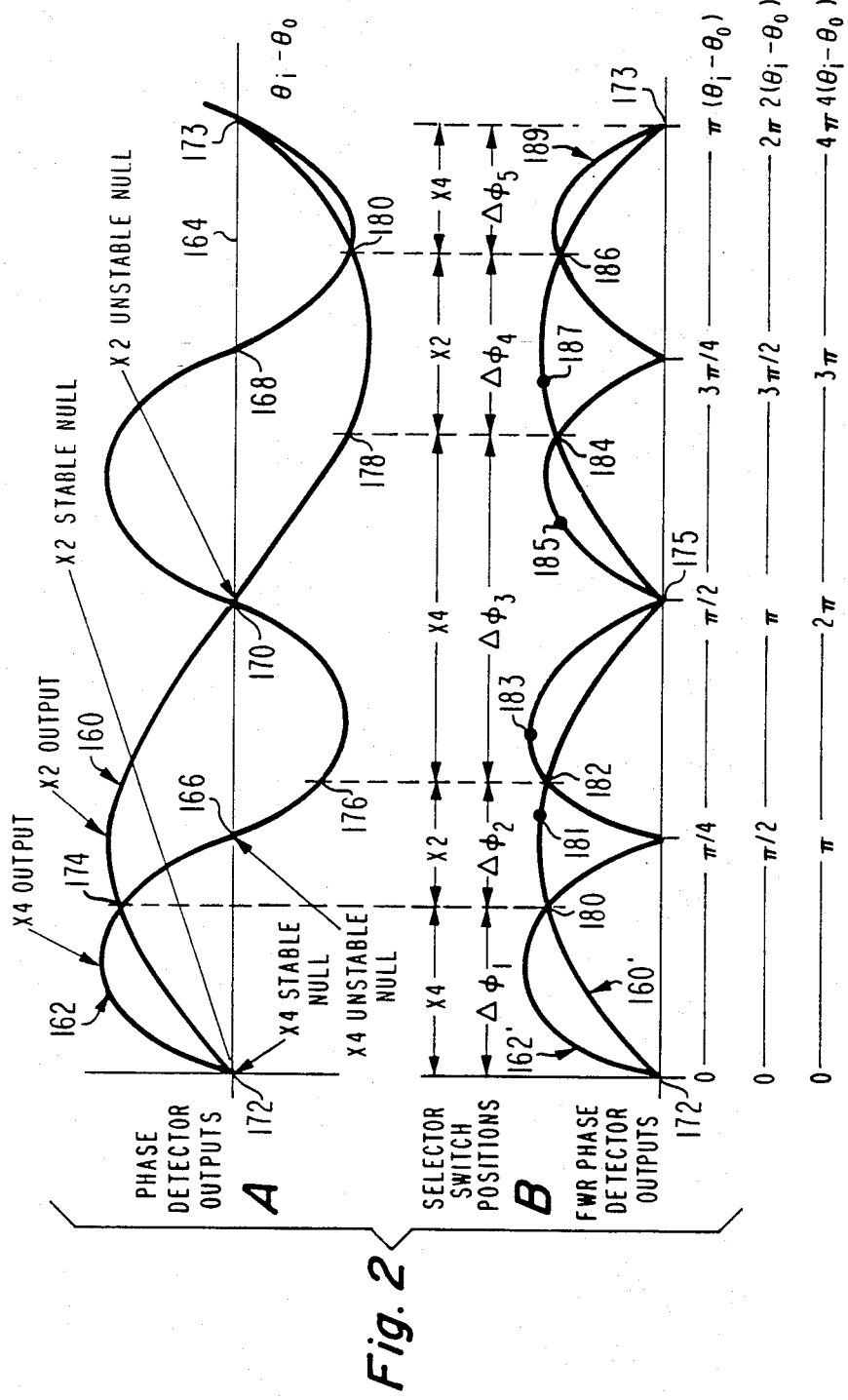
FIGS. 2(A and B) show characteristics curves of the output signals of phase detectors shown in FIG. 1, both in noninverted and inverted form.

The output of each of the two phase detectors 104 and 108 is a voltage whose amplitude varies around zero as the phase difference of the two input signals supplied thereto change. Thus, for example, the output $e_4$ of phase detector 104 (shown in Expression 7 below), is represented by the waveform 160 of FIG. 2A and the output $e_5$ of phase detector 108 (shown in Expression 8 below) is represented by the waveform 162 of FIG. 2A.

$$e_4 = \frac{A^2 B^2}{4} \sin 2(\theta_i - \theta_o) \qquad \text{(Exp. 7)}$$

$$e_5 = \frac{A^4 B^4}{16} \sin 4(\theta_i - \theta_o) \qquad \text{(Exp. 8)}$$

It is to be understood that waveforms 160 and 162 are sine wave signals only in the sense that they represent the output of the two phase detectors 104 and 108 as the difference in the phases $\theta_i$ and $\theta_o$ of the two signals supplied to each of the phase detectors varies, noting that the phase variation due to the carriers, $2\pi f_1 t$ and $2\pi f_{vco} t$ cancels itself at loop equilibrium. Thus, for example, if the phase angles $\theta_i$ and $\theta_o$ of the two signals $e_2$ and $e'_{vco}$ supplied to phase detector 104 of FIG. 1 remain at some fixed value, then the output of phase detector 104 will be a steady state voltage whose amplitude will depend upon the sine of the fixed phase difference between the two signals supplied thereto. If the phases of the two signals supplied to detector 104 are coincident, i.e., have a zero phase difference, then the output of phase detector 104 will be a zero value as represented by the point 172 of FIG. 2A and will be a stable null point.

On the other hand, if the phase difference between the two signals $e_2$ and $e'_{vco}$ supplied to phase detector 104 were initially 180° out of phase, the output of phase detector 104 would be the null point as represented at point 170 of FIG. 2A. However, this null point 170 is an unstable null point and the phase of the X2 output signal $e'_{vco}$ of VCO 116 from X2 multiplier 120 would change (either increase or decrease) until the phases of the two signals supplied to phase detector 104 were coincident, as represented by either point 172 or point 173 of FIG. 2A.

The foregoing can perhaps be better understood by the following explanation. If the phases of the two signals $e_2$ and $e'_{vco}$ supplied to phase detector 104 (FIG. 1) are initially coincident, as represented at point 172 of FIG. 2A, then if some pertubation should occur to cause a phase difference to develop between such two signals, the voltage generated at the output of phase detector 104 would be of such a polarity that when supplied through loop filter 110 and switch 114 to the input of VCO 116 it would cause the frequency of the output signal $e_{vco}$ of VCO 116 to change in that direction which will cause the phase difference to be reduced, thereby resulting in a return to a coincident phase condition between the two signals $e_2$ and $e'_{vco}$ supplied to phase detector 104.

Conversely, if the phases of the two signals $e_2$ and $e'_{vco}$ supplied to phase detector 104 were 180° different, and having an output as represented at the unstable null point 170 of FIG. 2A, a change in the phase difference between such two signals would result in a voltage generated at the output of phase detector 104 which would be supplied through loop filter 110 and switch 114 to the input of VCO 116 to cause the frequency $f_{vco}$ of the output signal $e_{vco}$ of VCO 116 to move farther away from the unstable null point 170. This process would continue until the phases of the two signals $e_2$ and $e'_{vco}$ supplied to phase detector 104 had become coincident and the output of phase detector 104 would then be either at point 172 or point 173 of FIG. 2A.

In a similar manner and for similar reasons, the stable null points of the phase detector 108, which compares the X4 frequencies of the input and VCO signals $e_1$ and $e_{vco}$, will occur at points 172, 170 and 173 and the unstable null points will occur at points 166 and 168. The output of phase detector 108 will pass through loop filter 112 and selector switch 114 to the input of VCO 116 when switch 114 makes contact with the output of filter 112 to cause the output of VCO 116 to shift in phase until the phases of the two signals $e_3$ and $e''_{vco}$ supplied to phase detector 108 are coincident so that one of the null points 172, 170, or 173, is attained.

As can be seen from FIG. 1, selector switch 114 can connect the output of loop filter 110 or the output of loop filter 112 to the input of VCO 116. The state of switch 114 is under control of the output of comparator 134. It can be assumed arbitrarily that the output of comparator 134 is either a high level signal or a low level signal depending upon whether the output of full wave rectifier 130 is greater or less than the output of full wave recitifier 132.

Selector switch 114 will be in its up position in FIG. 1 to connect the output of loop filter 110 to the input of VCO 116 when the output of comparator 134 is a high level signal as the result of the output of rectifier 130 being greater than the output of rectifier 132. When the output of full wave rectifier 132 becomes greater than that of full wave rectifier 130 the output of comparator 134 becomes a low level signal to cause switch 114 to connect the output of loop filter 112 to the input of VCO 116.

It is apparent from FIG. 1 that if switch 114 connects loop filter 110 to the input of VCO 116 a closed phase locked loop is then established which includes VCO 116, X2 frequency multiplier 120, phase detector 104 and loop filter 110. When the switch 114 is in its lower position to connect loop filter 112 to the input of VCO 116 then a second phase locked loop is established which includes VCO 116, X2 frequency multipliers 120 and 122, phase detector 108 and loop filter 112.

The determination of which of the two phase locked loops is closed depends upon the relative magnitudes of the outputs of full wave rectifiers 130 and 132 which in turn depend upon the outputs of phase detectors 104 and 108.

Referring now to the curves of FIG. 2B, there is shown the output of full wave rectifiers 130 and 132 with the curve 160' representing the output of full wave rectifier 130 and curve 162' the output of full wave rectifier 132. It will be observed that curve 160' corresponds to curve 160 of FIG. 2A but fully rectified. Similarly, the curve 162' of FIG. 2B corresponds to the curve 162 of FIG. 2A but fully rectified.

Further examination of FIG. 2B shows that during the phase intervals $\Delta\phi_1$, $\Delta\phi_3$, and $\Delta\phi_5$ the amplitude of the output of full wave rectifier 132 is greater than that of full wave rectifier 130 and that during phase intervals $\Delta\phi_2$ and $\Delta\phi_4$ the output of full wave rectifier 130 is greater than that of full wave rectifier 132. Thus, during phase intervals $\Delta\phi_2$ and $\Delta\phi_4$ the selector switch 114 will connect the output of loop filter 110 to the input of VCO 116 so that the phase locked loop including phase detector 104 and loop filter 110 will control the input to VCO 116 and will cause the phase of the output of VCO 116 to shift towards a stable null point as defined in the X2 phase locked loop including loop filter 110.

More specifically, the phase of the output of VCO 116 will shift in such a direction that the output of phase detector 104 will shift toward either the stable null point 172 or the second stable null point 173 in FIG. 2B. Assume, for purposes of discussion, that the initial phase relation between the outputs of the X2 frequency multipliers 120 and 102, as supplied to phase detector 104, is as indicated at point 181 in FIG. 2B. The output of phase detector 104 will then shift towards the stable null point 172 under control of the X2 phase locked loop which includes loop filter 110. However, when point 181 moves past the point 180 (to the left of point 181 in FIG. 2B) the output of phase detector 108 will exceed the output of phase detector 104 so that the output of full wave rectifier 132 will become greater than that of full wave rectifier 130. The comparator 134 will then generate a low level output signal to cause switch 114 to connect the output of loop filter 112 to the input of VCO 116 to pass control of the system to phase detector 108 and loop filter 112.

The output of phase detector 108 will then shift along its output characteristic curve 162' (FIG. 2) towards a stable null point (point 172) which can be seen to represent a higher voltage than the output of phase detector 108, thereby providing a fast transition of the phase of VCO 116 to the desired stable null point 172.

The foregoing is important since it is the increased speed with which the logic finds one of the four possible stable null points that forms the essence of the invention. In particular the loop will never be under control of the low level signals associated with unstable null positions of the phase detectors.

Should the initial phase relation between the received signal $e_1$ and the output $e_{vco}$ of the VCO be as represented at point 183 of FIG. 2B, then the output of phase detector 108 will control since it is larger than the output of phase detector 104. Thus point 183 of waveform 2B will shift towards the stable null point 175 of FIG. 2B. Point 175 is a stable null point since it is the positive going cross-over of signal 162 of FIG. 2A which is the output of phase detector 108 of FIG. 1.

As another example, if the initial condition is as represented by point 185 of FIG. 2B, such point 185, which is the output of phase detector 108 and filter 112, will shift towards the stable null point 175.

As still another example, should the initial phase relationship be as represented by point 187 of FIG. 2B, then the output of phase detector 104 will move towards the stable null point 173 of FIG. 2B. However, when it reaches point 186 of FIG. 2B control of the change of phase of VCO 116 will pass to the phase locked loop including loop filter 112 whose output is represented by the curve segment 189 of FIG. 2B. Point 187 will continue to move toward point 173 until it reaches such point 173 which is a stable null point of the output of phase detector 108.

What is claimed is:

1. A carrier recovery loop for the reception of quadraphase shift keyed (QPSK) signals $e_1$ of frequency $f_1$ and comprising:

first and second frequency multiplying means for successively multiplying $f_1$ by two to produce a signal $e_2$ of frequency $2f_1$ and then again by two to produce a signal $e_3$ of frequency $4f_1$ with the phase modulation thereby removed;

a voltage controlled oscillator (VCO) for producing an output signal $e_{vco}$ of variable frequency $f_{vco}$;

third and fourth frequency multiplying means for successively multiplying $f_{vco}$ by two to produce a signal $e'_{vco}$ of frequency $2f_{vco}$ and then again by two to produce a signal $e''_{vco}$ of frequency $4f_{vco}$;

first and second phase detector means responsive respectively to $e_2$ and $e'_{vco}$ and to $e_3$ and $e''_{vco}$ to produce first and second output signals;

means for filtering out high frequency components from the output signals of said first and second phase detectors;

said phase detectors each having a characteristic operating curve wherein the output of the phase detector varies substantially sinusoidally with linear variation of the phase difference of the two signals supplied thereto and where the negative-going cross-over transitions of said sinusoidal operating characteristic curves are unstable; and means responsive to the output signals of said means for filtering to generate a control signal indicating when the output of said second phase detector is nearing an unstable negative-going cross-over transition; and switching means responsive to said control signal to connect the output signal of said first phase detector to the input of said VCO when the output of said second phase detector is near an unstable negative-going cross-over transition.

2. A carrier recovery loop as in claim 1 in which said means to generate a control signal comprises:

first and second rectifying means for rectifying the output signals of said first and second phase detector means; and comparator means responsive to the relative amplitudes of the rectified output signals of said first and second rectifying means to produce said control signal.

3. A carrier recovery loop for the reception of quadraphase shift keyed (QPSK) signals $e_1$ of frequency $f_1$ comprising:

first and second phase detector means each responsive to the phases of two signals supplied thereto to generate an output signal whose amplitude varies substantially sinusoidally with a linear change in phase difference between the two signals supplied thereto and with the negative going transitions of said sinusoidal output signal being unstable null points;

first frequency multiplier means responsive to $e_1$ to supply a signal $e_2$ of frequency $2f_1$ to said first phase detector means and a signal $e_3$ of frequency $4f_1$ to said second phase detector means;

a voltage controlled oscillator (VCO) having a frequency control input and an output signal $e_{vco}$ of frequency $f_{vco}$;

second frequency multiplier means responsive to $e_{vco}$ to supply a signal $e'_{vco}$ of frequency $2f_{vco}$ to said first phase detector means and a signal $e''_{vco}$ of frequency $4f_{vco}$ to said second phase detector means;

switching means responsive to a control signal to connect the output of said first phase detector means to the frequency control input of said VCO when the output signal of said first phase detector means is greater than the output signal of said second phase detector means, and to connect the output of said second phase detector means to the frequency control input of said VCO during the remainder of the time; and amplitude responsive means responsive to the relative amplitudes of the output signals of said first and second phase detector means to generate said control signal.

4. A carrier recovery loop as in claim 3 in which said amplitude responsive means comprises:

first and second rectifying means for rectifying the output signals of said first and second phase detector means; and comparator means responsive to the relative amplitudes of the rectified output signals of said first and second rectifying means to produce said control signal.

5. A carrier recovery loop for the reception of a quadraphase shift keyed (QPSK) signal $e_1$ of nominal frequency $f_1$ and comprising:

first means responsive to $e_1$ to produce a signal $e_2$ of frequency $2f_1$ and a second signal $e_3$ of frequency $4f_1$;

a voltage controlled oscillator (VCO) for generating a signal $e_{vco}$ of frequency $f_{vco}$;

second means responsive to $e_{vco}$ to generate a signal $e'_{vco}$ of frequency $2f_{vco}$ and a signal $e''_{vco}$ of frequency $4f_{vco}$;

first and second phase locked loops comprising:

first and second phase detector means, respectively, responsive to $e_2$ and $e'_{vco}$ and to $e_3$ and $e''_{vco}$ respectively, to generate output signals $e_4$ and $e_5$, each of which varies substantially sinusoidally with a linear change in the phase difference of the two signals supplied thereto and further with $e_5$ having twice the rate of sinusoidal variation as does $e_4$, and further with the negative-going cross-over transitions of $e_5$ constituting unstable null points in said second phase locked loop; and control means responsive to the comparative amplitudes of $e_4$ and $e_5$ to connect $e_4$ to said VCO during predetermined time periods bracketing each unstable null of $e_5$ and to connect $e_5$ to said VCO during the remaining time.

6. In a system for receiving bursts of quadraphase shift keyed (QPSK) signals $e_1$ of frequency $f_1$, a method of recovering and maintaining the phase of the carrier signal comprising the steps of:

generating a voltage controlled signal $e_{vco}$ of frequency $f_{vco}$ at the output of a voltage controlled oscillator (VCO);

multiplying the frequency $f_{vco}$ of $e_{vco}$ by two and by four to produce signals $e'_{vco}$ of frequency $2f_{vco}$ and $e''_{vco}$ of frequency $4f_{VCO}$;

multiplying the frequency $f_1$ of $e_1$ by two and by four to produce signals $e_2$ of frequency $2f_1$, and $e_3$ of frequency $4f_1$;

generating signals $e_4$ and $e_5$ indicating respectively the phase difference between the signals $e_2$ and $e'_{vco}$ and between the signals $e_3$ and $e''_{vco}$, and where $e_4$ and $e_5$ each varies in a substantially sinusoidal manner with linear variation in the phase difference between the signals $e_2$ and $e'_{vco}$ and the signals $e_3$ and $e''_{vco}$; and where the rate of sinusoidal variation for $e_5$ is twice that of $e_4$; and supplying $e_4$ to the VCO when $e_5$ is within a predetermined angular distance from the negative-going cross-over transition of the sinusoidal variation of $e_5$; and supplying $e_5$ to the VCO when $e_5$ is outside said predetermined angular distance.

7. In a system employing bursts of quadraphase shift keyed (QPSK) signals $e_1$ of frequency $f_1$, the method of recovering the phase of the carrier signal comprising the steps of:

generating in a voltage controlled oscillator (VCO) a voltage controlled signal $e_{vco}$ of frequency $f_{vco}$;

doubling and quadrupling $f_{vco}$ to produce signals $e'_{vco}$ of frequency $2f_{vco}$ and $e''_{vco}$ of frequency $4f_{vco}$;

doubling and quadrupling $f_1$ to produce signals $e_2$ of frequency $2f_1$, and $e_3$ of frequency $4f_1$;

generating signals $e_4$ and $e_5$ indicating respectively the phase difference between $e_2$ and $e'_{vco}$ and between $e_3$ and $e''_{vco}$, and where $e_4$ and $e_5$ each varies in a substantially sinusoidal manner with linear variation in the phase differences between $e_2$ and $e'_{vco}$ and between $e_3$ and $e''_{vco}$;

supplying $e_4$ to the VCO when the amplitude of $e_5$ is less than the amplitude of $e_4$; and supplying $e_5$ to the VCO when the amplitude of $e_5$ is greater than the amplitude of $e_4$.

* * * * *